(12) United States Patent
Dominique et al.

(10) Patent No.: US 7,764,656 B2
(45) Date of Patent: Jul. 27, 2010

(54) METHODS OF MULTIPATH ACQUISITION FOR DEDICATED TRAFFIC CHANNELS

(75) Inventors: Francis Dominique, Rockaway, NJ (US); Hongwei Kong, Denville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 282 days.

(21) Appl. No.: 11/179,577

(22) Filed: Jul. 13, 2005

(65) Prior Publication Data

US 2007/0014255 A1    Jan. 18, 2007

(51) Int. Cl.
H04B 7/216    (2006.01)
H04B 7/00    (2006.01)

(52) U.S. Cl. .................. 370/335; 455/65; 455/504; 455/296; 375/148; 370/328

(58) Field of Classification Search ........... 455/63.4, 455/506, 421, 440, 456, 9, 10, 504, 101, 455/278, 65, 296; 333/142; 342/422–445; 370/335, 342; 375/146–150, E1.032
See application file for complete search history.

(56) References Cited

U.S. PATENT DOCUMENTS

| | | | |
|---|---|---|---|
| 6,356,607 B1 | 3/2002 | Scott et al. | |
| 6,687,512 B1 | 2/2004 | Shinozaki et al. | |
| 6,813,284 B2* | 11/2004 | Vayanos et al. | 370/537 |
| 6,859,445 B1 | 2/2005 | Moon et al. | |
| 7,215,930 B2 | 5/2007 | Malladi | |
| 7,623,484 B2 | 11/2009 | Dominique et al. | |
| 2002/0075946 A1* | 6/2002 | Seo et al. | 375/148 |
| 2002/0136278 A1* | 9/2002 | Nakamura et al. | 375/148 |
| 2002/0196767 A1* | 12/2002 | Sim | 370/342 |
| 2003/0053522 A1* | 3/2003 | Hayoun et al. | 375/147 |
| 2003/0054768 A1* | 3/2003 | Challa et al. | 455/63 |
| 2003/0081562 A1* | 5/2003 | Iwamatsu et al. | 370/314 |
| 2003/0112776 A1 | 6/2003 | Brown et al. | |
| 2003/0128678 A1* | 7/2003 | Subrahmanya et al. | 370/335 |
| 2004/0028013 A1 | 2/2004 | Fitton et al. | |
| 2004/0071193 A1 | 4/2004 | Atarashi et al. | |
| 2004/0077357 A1* | 4/2004 | Nakada | 455/452.1 |
| 2004/0240479 A1 | 12/2004 | Bohnhoff | |
| 2005/0002361 A1 | 1/2005 | Dick et al. | |

(Continued)

FOREIGN PATENT DOCUMENTS

EP    1 353 451    10/2003

(Continued)

OTHER PUBLICATIONS

"Universal Mobile Telecommunications System (UMTS); Physical channels and mapping of transport channels onto physical channels (FDD)"; (3GPP TS 25.211 version 5.0.0 Release 5); ETSI TS 125 211 V5.0.0 (Mar. 2002).

(Continued)

*Primary Examiner*—Lester Kincaid
*Assistant Examiner*—Daniel Lai
(74) *Attorney, Agent, or Firm*—Harness, Dickey & Pierce

(57) ABSTRACT

In a method of multipath acquisition for a dedicated traffic channel, path positions of the traffic channel that have desired signal energy for processing in a base station receiver may be determined as a function of information contained in a data part of the traffic channel.

15 Claims, 5 Drawing Sheets

U.S. PATENT DOCUMENTS

| | | | |
|---|---|---|---|
| 2005/0002444 A1* | 1/2005 | Wei et al. ............... | 375/147 |
| 2005/0002445 A1 | 1/2005 | Dunyak et al. | |
| 2005/0101253 A1 | 5/2005 | Pajukoski et al. | |
| 2006/0013289 A1 | 1/2006 | Hwang | |
| 2006/0088081 A1 | 4/2006 | Withington et al. | |
| 2006/0120438 A1 | 6/2006 | Reial | |
| 2006/0256971 A1 | 11/2006 | Chong et al. | |
| 2007/0195864 A1 | 8/2007 | Jonsson et al. | |
| 2008/0075150 A1 | 3/2008 | Rouphael et al. | |

FOREIGN PATENT DOCUMENTS

| | | |
|---|---|---|
| WO | WO 03/041292 | 5/2003 |
| WO | WO 03/061132 | 7/2003 |

OTHER PUBLICATIONS

Qinqing Zhang et al: "Enhanced Power Ramping Scheme for UMTS Random Access Channel" Vehicular Technology Conference, 1999. VTC 1999—Fall. IEEE VTS $50^{th}$ Amsterdam, Netherlands Sep. 19-22, 1999, Piscataway, NJ, USA, IEEE, US, Sep. 19, 1999, pp. 2631-2635, XP010353383 ISBN: 0-7803-5435-4.

ETSI TS 125 211 V6.4.0 (Mar. 2005), Technical Specification, Universal Mobile Telecommunications System (UMTS); Physical channels and mapping of transport channels onto physical channels (FDD) (3GPP TS 25.211 verision 6.4.0 Release 6).

3GPP TS 25.211 v4.6.0 (Sep. 2002), Technical Specification, $3^{rd}$ Generation Partnership Project; Technical Specification Group Radio Access Network; Physical channels and mapping of transport channels onto physical channels (FDD) (Release 4).

International Search Report and Written Opinion in counterpart International Application No. PCT/US2006/027470 dated Dec. 27, 2006.

U.S. Office Action dated Mar. 19, 2009 for U.S. Appl. No. 11/138,362.

U.S. Office Action dated Aug. 26, 2009 for U.S. Appl. No. 11/179,576.

U.S. Office Action dated Sep. 2, 2009 for U.S. Appl. No. 11/188,711.

U.S. Office Action dated Dec. 16, 2009 for U.S. Appl. No. 11/138,362.

U.S. Office Action dated Dec. 7, 2009 for U.S. Appl. No. 11/179,576.

U.S. Office Action dated Jan. 21, 2010 for U.S. Appl. No. 11/188,711.

* cited by examiner

METHODS OF MULTIPATH ACQUISITION FOR DEDICATED TRAFFIC CHANNELS

CROSS-REFERENCE TO RELATED APPLICATIONS

This application is related to U.S. patent application Ser. No. 11/090,064, filed Mar. 28, 2005 to Dominique et al. and entitled "METHODS OF MULTIPATH ACQUISITION FOR DEDICATED TRAFFIC CHANNELS, and to co-pending U.S. patent application Ser. No. 11/179,576, filed Jul. 13, 2005 to Dominique et al. and entitled "METHODS OF MULTIPATH ACQUISITION FOR DEDICATED TRAFFIC CHANNELS. The entire contents of each of these co-pending U.S. patent applications are hereby incorporated by reference herein.

BACKGROUND OF THE INVENTION

1. Field of the Invention

The present invention relates generally to multipath acquisition of dedicated traffic channels in wireless communication systems or networks.

2. Description of the Related Art

FIG. 1 is a frame structure of a dedicated traffic channel for UMTS uplink. Systems or networks designed based on third generation wireless standards such as 3GPP (UMTS) and 3GPP2 (cdma2000) use a dedicated traffic channel in the uplink for communication from mobile users (or user equipment (UE)) to the base station (or Node-B). As shown in FIG. 1, the dedicated uplink traffic channel may include two parts, a data part (Dedicated Physical Data CHannel (DPDCH) in UMTS, known as a Fundamental CHannel/Supplemental CHannel (FCH/SCH) in cdma2000), and a control part (Dedicated Physical Control CHannel (DPCCH) in UMTS, known as a pilot/power control sub-channel in cdma2000).

For the uplink DPCCH in UMTS, there are 15 slots per radio frame (i.e., processing duration corresponding to 15 slots, where the length of the frame is 38,400 chips). One radio frame is 10 ms in duration; thus each slot is 0.667 ms in duration.

The uplink DPCCH may be used to carry control information generated at Layer 1 (the physical layer). Layer 1 control information includes known pilot bits to support channel estimation for coherent detection, transmit power-control (TPC) commands, feedback information (FBI), and an optional transport-format combination indicator (TFCI). The TFCI informs the receiver about the instantaneous transport format combination of the transport channels mapped to the simultaneously transmitted uplink DPDCH radio frame.

Within each slot, the UE thus transmits pilot bits and certain control bits such as TFCI, FBI and TPC bits. Each slot has a total of ten (10) combined pilot bits and control bits. The actual combinations of bit numbers may change and may be controlled by the Radio Network Controller (RNC) at the network, for example. An example configuration may be 5 pilot bits, 2 TFCI bits, 1 FBI bits and 2 TPC bits for one slot.

The pilot bits are known to both the Node-B and the UE; the remaining control bits (TPC, FBI and TFCI) are not known to the base station (Node-B). The number of TPC bits per slot is typically either 1 or 2 bits. If there are two TPC bits in one slot, the values of the 2 bits are identical, i.e., either both TPC bits are 0 or both bits are 1. For 3GPP2 (cdma2000), the frame structure is similar to FIG. 1, although there are no TFCI and FBI bits defined in 3GPP2. For the following discussion, a conventional UMTS transmitter/receiver interface is described.

FIG. 2 is a block diagram of a conventional UMTS uplink transmitter/receiver relationship. Referring to FIG. 2, at the transmitter 200 (of the UE), the Dedicated Traffic Channel/at coding and rate matching block 202. The Dedicated Control Channel (DTCH/DCCH) are coded and merged into one bit stream. This becomes the DPDCH. The DPCCH and the DPDCH are then modulated using BPSK (Binary Phase Shift Keying) at BPSK modulators 205. The DPCCH and the DPDCH are then spread by two different and orthogonal codes (Walsh codes) at 210 and weighted by corresponding gains at 215 to achieve certain power levels. The two channels are then combined (code-division multiplexed) at multiplexer 220. The combined signal may be scrambled and filtered by a shaping filter 225 before modulated to RF (not shown for purposes of clarity) and sent through the propagation channel 230 to the base station (Node-B) receiver 250.

At the Node-B receiver 250, the received signal first passes a matched filter 255. The filtered signal may then be sent to a DPCCH and DPDCH processing block 260 to generate DPDCH soft symbols and a TFCI word for further processing by blocks such as turbo/convolutional decoders (shown in FIG. 2 as a DTCH/DCCH Decoder) to recover the transmitted DTCH/DCCH data. The DPCCH and DPDCH processing block 260 also generates propagation channel measurements such as mobility of the UE. In FIG. 2, for example, this may be shown as a 'binary mobility indicator' 264, which may have a value of '1' to indicate a high mobility user and a value of '0' to indicate a low mobility user. This information may be used to improve the multipath acquisition performance for UEs with different mobility.

The DPCCH and DPDCH processing block 260 thus requires the knowledge of propagation paths, primarily the path positions. This knowledge is produced in the receiver 250 by a multipath acquisition block 265 and is managed by an 'existing and new paths management' block 270. The multipath acquisition block 265 searches a possible range of path positions (also occasionally referred to herein as 'paths' or 'hypotheses') and reports all positions that are determined as having significant signal energy, such as above some given threshold.

The existing and new paths management block 270 further screens the paths reported by the multipath acquisition block 265 and the paths that are already in use in the DPDCH and DPCCH processing block 260. The existing and new paths management block 270 removes repetitive paths and/or weak paths, adds new paths just discovered by the multipath acquisition block 265 and then passes the updated paths' information back to the DPDCH and DPCCH processing block 260. The frequency of the update can be programmable, depending on the design goals. For example, an update interval or frequency may be one DPCCH frame (10 ms). As will be seen below, conventional multipath acquisition uses only the pilot signal information in the DPCCH.

FIGS. 3A and 3B illustrate process flows for multipath acquisition of a dedicated traffic channel. In particular, FIGS. 3A and 3B generally describe the processing in multipath acquisition block 265 of FIG. 2. This processing flow is described in U.S. patent application Ser. No. 11/090,064 by the inventors and entitled "METHODS OF MULTIPATH ACQUISITION FOR DEDICATED TRAFFIC CHANNELS", filed Mar. 28, 2005, hereafter the "'064 application".

Present and future 3GPP/3GPP2 wireless communication systems should be able to support high mobility users. One example application is a user making phone calls from a high-speed train. The record velocity on a commercial high-speed train is the MAGLEV in Shanghai, China, which travels at speeds in excess of 480 Km per hour. For this velocity, the maximum frequency shift for a UMTS system operating in the 2 GHz band is around 2 KHz.

Taking half a cycle of a sinusoid as the coherence interval, then with this frequency shift there is a coherence interval of about 0.25 ms. This presents a substantial challenge to a single pilot signal processing block used in the prior art because the pilot accumulation interval in one slot may exceed the coherence interval of the channel by a substantially large margin. For example, in UMTS, there may be a maximum of 8 pilot symbols per slot, out of the 10 total symbols in that slot. The pilot interval in this case is 0.5333 ms, larger than the 0.25 ms cycle of the frequency shift. In this case, if the pilot signals are still accumulated in the slot, the signal energy is more or less cancelled to zero (considering the accumulation sinusoidal in one cycle, the output is zero). Therefore, a modification is made to provide additional pilot processing blocks so as to more efficiently handle high mobility UEs.

Referring to FIG. 3A, and as described in the '064 application, the pilot energy over a frame is calculated for a specific path position (hypothesis). Initially, the matched filter output from matched filter 255 corresponding to this hypothesis (which is a complex signal) is descrambled and despreaded (310). The pilot pattern is also removed by function 310 as well.

To handle frequency shifts as high as 2 KHz, the pilot signal is bi-sected or divided into two segments (320a, 320b). One segment consists of four (4) pilot symbols, which would have an interval of 0.26667 ms and would barely satisfy the coherence interval for 2 KHz, but nonetheless maximizes the coherence accumulation gain. The other segment has 4 or fewer pilot symbols, with an interval less than or equal to 4 symbols ($\leq 0.26667$ ms) since in 3GPP the largest number of pilot symbols in a slot is 8. The pilot symbols within each segment are accumulated (320a, 320b) before the calculation of their corresponding L2-norms (330a, 330b).

Next, the L2-norms of the outputs from 320a and 320b are formed (330a and 330b). Assuming for example that the complex output signal is z=a+j*b, its L2-norm is given by $L2(z)=a^2+b^2$. The L2-norms of the accumulated pilot signal are further accumulated over a frame interval (340).

As shown in FIG. 3A, the binary mobility indicator 264 from FIG. 2 is used to decide whether a bisect segmentation is needed or not. This preserves the acquisition performance for lower or low mobility users, as lower or low mobility users would not require segmentation on the pilot signals in a slot, and therefore would retain higher coherent accumulation gain. Thus, binary mobility indicator information is used to improve multipath acquisition performance for high mobility users while retain the high performance gain from coherent pilot combining for low mobility users.

In addition to the pilot signal processing at 320a/b and 330a/b, three additional processing block groups are included for processing control information such as output symbols corresponding to TFCI bits (322 and 332), FBI bits (342 and 334) and TPC bits (at 326 and 336).

As TFCI and FBI control bits in a given slot are unknown to the Node-B, output symbols corresponding to these control bits cannot be accumulated (see 332 and 334) prior to the L2-norm calculations at 322 and 332. Otherwise, the signals may cancel one another due to opposite-polarity signs of the symbols. On the other hand, the Node-B knows that if there are multiple TPC bits in one slot, they have to be identical.

Therefore, the output symbols corresponding to the TPC bit(s) in a slot are accumulated (326) prior to being subject to the L2-norm calculation (336), in the same way as the pilot symbols are processed. The L2-norms of the accumulated TFCI, FBI and TPC symbols are further accumulated over the frame interval (340). Since additional energy is collected, the probability that new paths are discovered and existing paths are maintained is increased. Equivalently, to maintain the same probability of detection and or maintain the paths, the UE now can transmit as a lower power level, therefore reducing interference to other users in the cell. The resultant output is the DPCCH frame energy (350).

Referring to FIG. 3B, the DPCCH frame energy for each hypothesis (355) is compared with a fixed pre-defined or given threshold (365). Hypotheses with DPCCH frame energy surpassing the threshold (output of 365 is 'YES') are reported (375) to the existing and new paths management block 270 in FIG. 2 for further processing.

The multipath acquisition process flow described in the '064 application, while configured to more efficiently handle high mobility UEs, uses only the DPCCH signal energy to detect the propagation paths.

SUMMARY OF THE INVENTION

An example embodiment of the present invention is directed to a method of multipath acquisition for a dedicated traffic channel. In the method, path positions of the traffic channel that have desired signal energy for processing in a base station receiver may be determined as a function of at least information contained in a data part of the traffic channel.

Another example embodiment of the present invention is directed to a method of multipath acquisition for a dedicated traffic channel. In the method, path positions of the traffic channel that have desired signal energy for processing in a base station receiver may be determined based on a DPDCH signal contained in the traffic channel and on information contained in a control part of the traffic channel.

Another example embodiment of the present invention is directed to a method of calculating frame energy of a dedicated uplink traffic channel frame for multipath acquisition of one or more path positions of the frame that are received by a base station receiver. In the method, a filtered DPDCH signal output of the traffic channel frame that is received by the receiver, and which corresponds to a given path position, may be subject to descrambling and dispreading, and the data-dependency of the DPDCH may be removed using re-encoded DPDCH symbols of the frame so as to output first and second output symbols corresponding to the DPDCH signal. The first output symbols in a first given segment of a slot of the frame may be accumulated to output a first accumulated data signal, and the second output signals in a second given segment of the frame may be accumulated to output a second accumulated data signal. L2 norms for the first and second accumulated data signals may be calculated to generate a plurality of input signals, and the input signals accumulated over a given duration to generate a desired DPDCH frame energy value for the given path position.

Another example embodiment of the present invention is directed to a method of determining valid paths for a dedicated uplink traffic channel received at a base station receiver. In the method, and for each given path position, a DPCCH frame energy value may be determined based on information contained in a control part of a frame of the traffic channel, and a DPDCH frame energy value over a given duration may be determined based on information contained in a data part of the frame. The DPCCH and DPDCH frame energy values may be combined to generate a user energy value over the given duration. One of the DPCCH frame energy and the user energy values for each given path position may be compared to a given threshold, and those path positions where one of the DPCCH frame energy or user energy values exceed the threshold may be reported to processing circuitry within the base station receiver.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

Although the following description relates to multipath acquisition for a dedicated traffic channel in a network based on UMTS technologies and/or related standards, and will be described in this example context, the example methodology may be applicable to any of CDMA (IS95, cdma2000 and various technology variations), various UMTS technologies and/or standards (release 99, R4, R5, R6 and above), GSM, 802.11 and/or related technologies.

Thus, the example embodiments shown and described herein are meant to be illustrative only and not limiting in any way. As such, various modifications will be apparent to those skilled in the art for application to wireless communication systems or networks based on technologies other than the above, which may be in various stages of development and intended for future replacement of, or use with, the above networks or systems.

As used herein, the term user equipment (UE) may be synonymous to a mobile, mobile station, mobile user, user, subscriber, wireless or access terminal and/or remote station, etc., for example, and may describe a remote user of wireless resources in a wireless communication network. Where used below, the term Node-B is synonymous with base transceiver station, base station, access point, etc. and may describe equipment that provides voice and/or data connectivity between a communication network and one or more mobile stations. Occasionally herein the terms Node-B and base station may be used interchangeably.

As discussed above, the '064 process for multipath acquisition for a dedicated traffic channel uses only the DPCCH signal energy to detect the path positions. However, multipath acquisition performance may be improved if information in a data part of the traffic frame is included in the calculation of the frame energy.

Accordingly, a revised energy metric may be calculated. Instead of calculating only the DPCCH signal energy, information from the data part of the traffic channel, (e.g., a DPDCH signal) may be used. In other words, a DPDCH frame energy metric ("frame energy metric") may be calculated over a given duration. Multipath acquisition performance may be improved if the DPDCH signal is included in the calculation. In this case, the frame energy of the entire received signal may be calculated.

Any improvement in acquisition performance is desirable for compressed-mode because some slots (up to 7 out of 15) in a frame can be silent in this mode. Therefore, collecting as much signal energy as possible in multipath acquisition block 265 helps to boost the probability of detecting new paths. Determining path positions of the traffic channel which have desired signal energy based on the data part of the traffic frame may also be beneficial for high mobility UEs, where the velocity can be as high as 480 Kmph. In this case, a bisect segmentation of the pilot signal is barely enough to compensate for the energy loss due to frequency shift.

Figure 1:
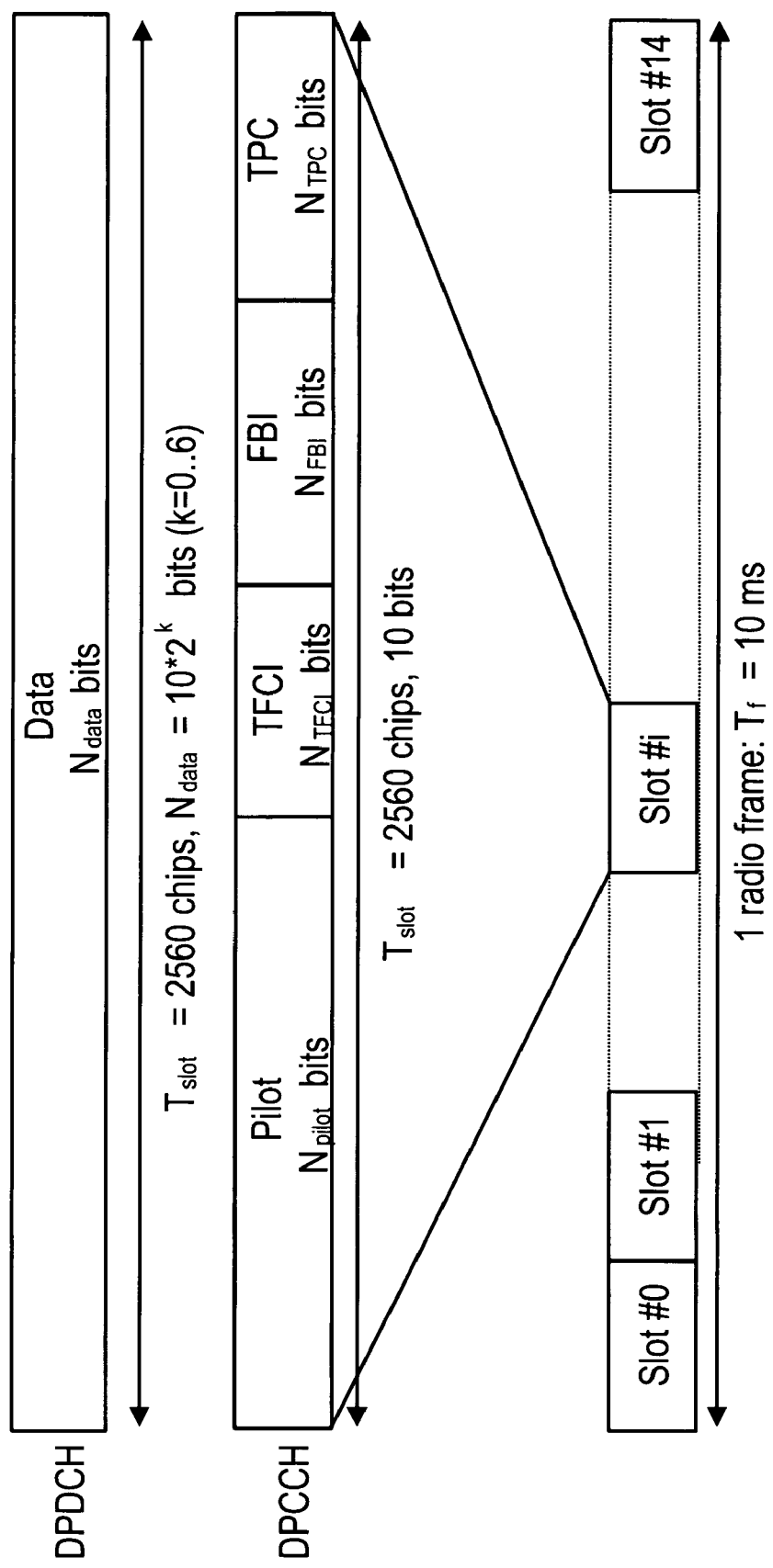
FIG. 1 is a frame structure of a dedicated traffic channel for UMTS uplink.
Figure 2:
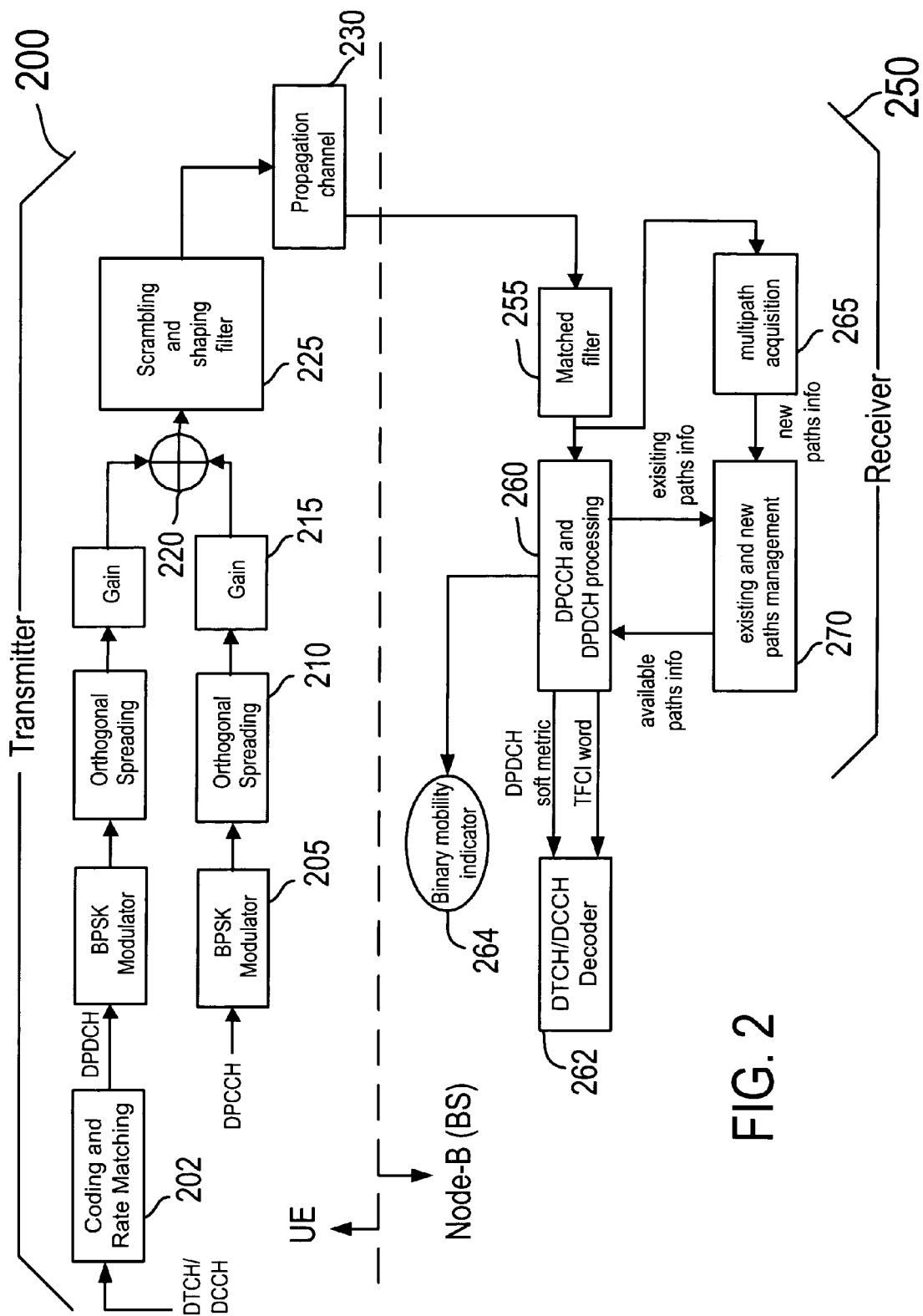
FIG. 2 is a block diagram of a conventional UMTS uplink transmitter/receiver relationship.
Figures 3A, 3B:
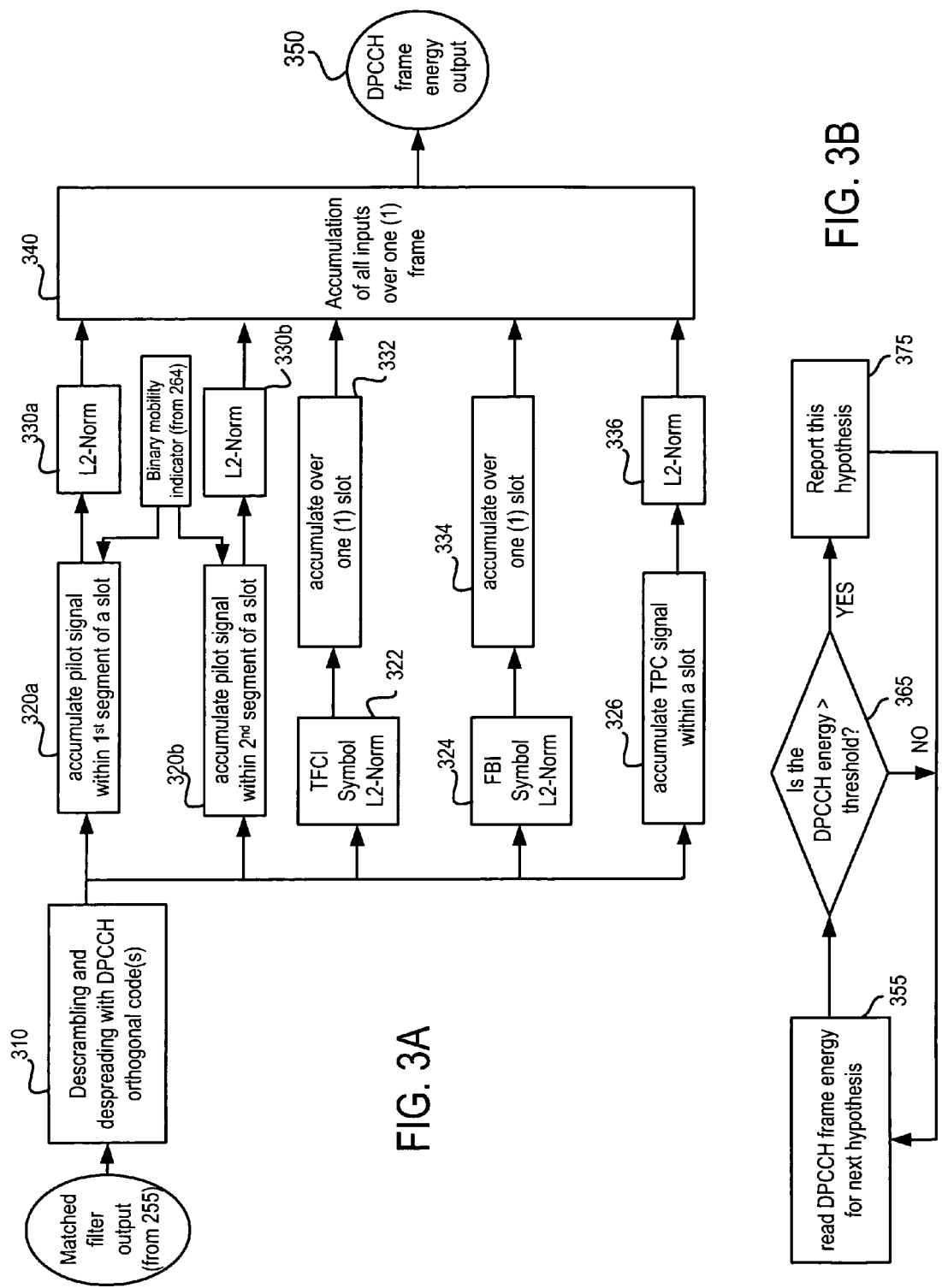
FIGS. 3A and 3B illustrate process flows for multipath acquisition of a dedicated traffic channel.
Figures 4A, 4B:
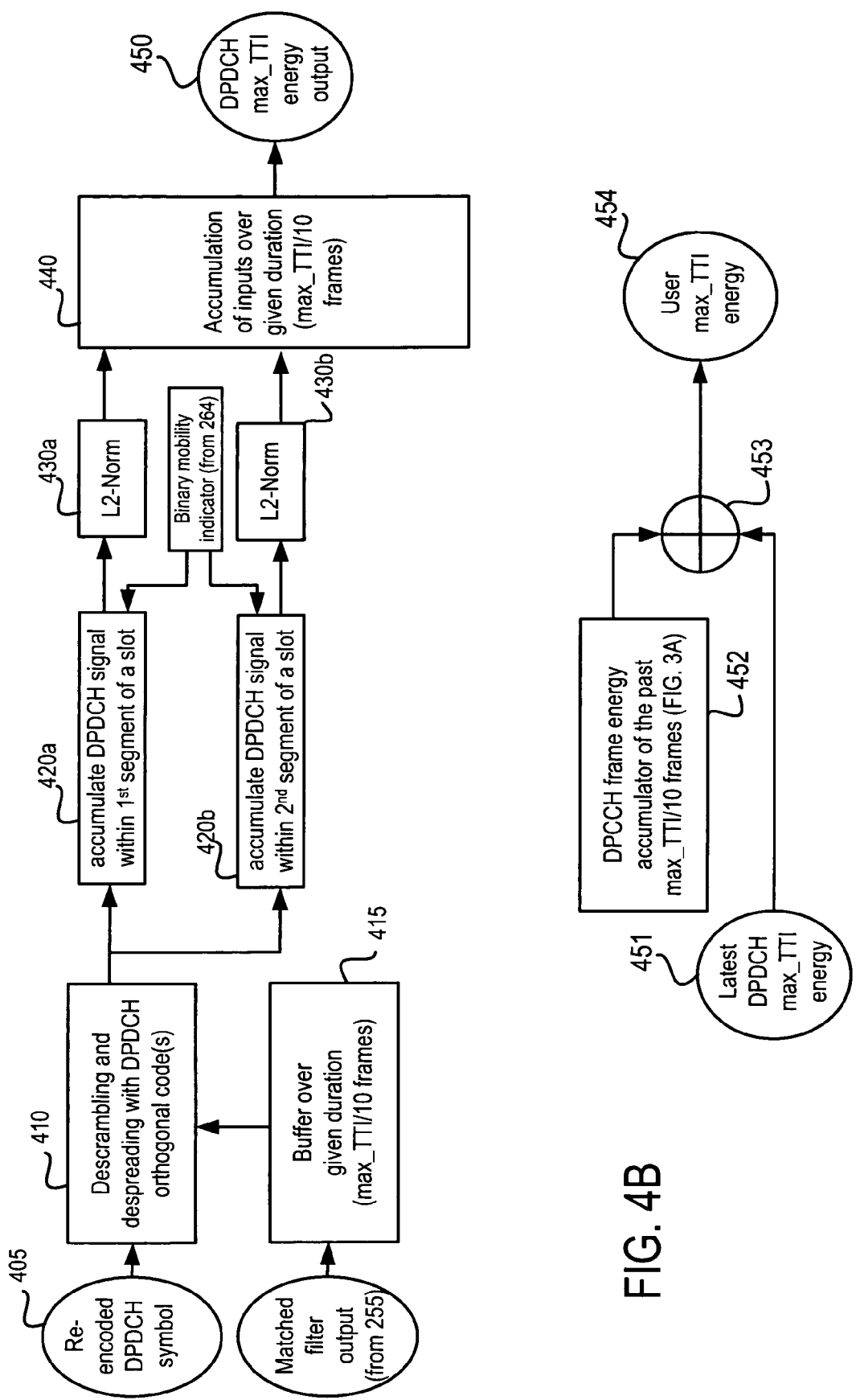
FIGS. 4A-4C illustrate process flows for multipath acquisition of a dedicated traffic channel in accordance with an example embodiment of the present invention.
Figure 4C:
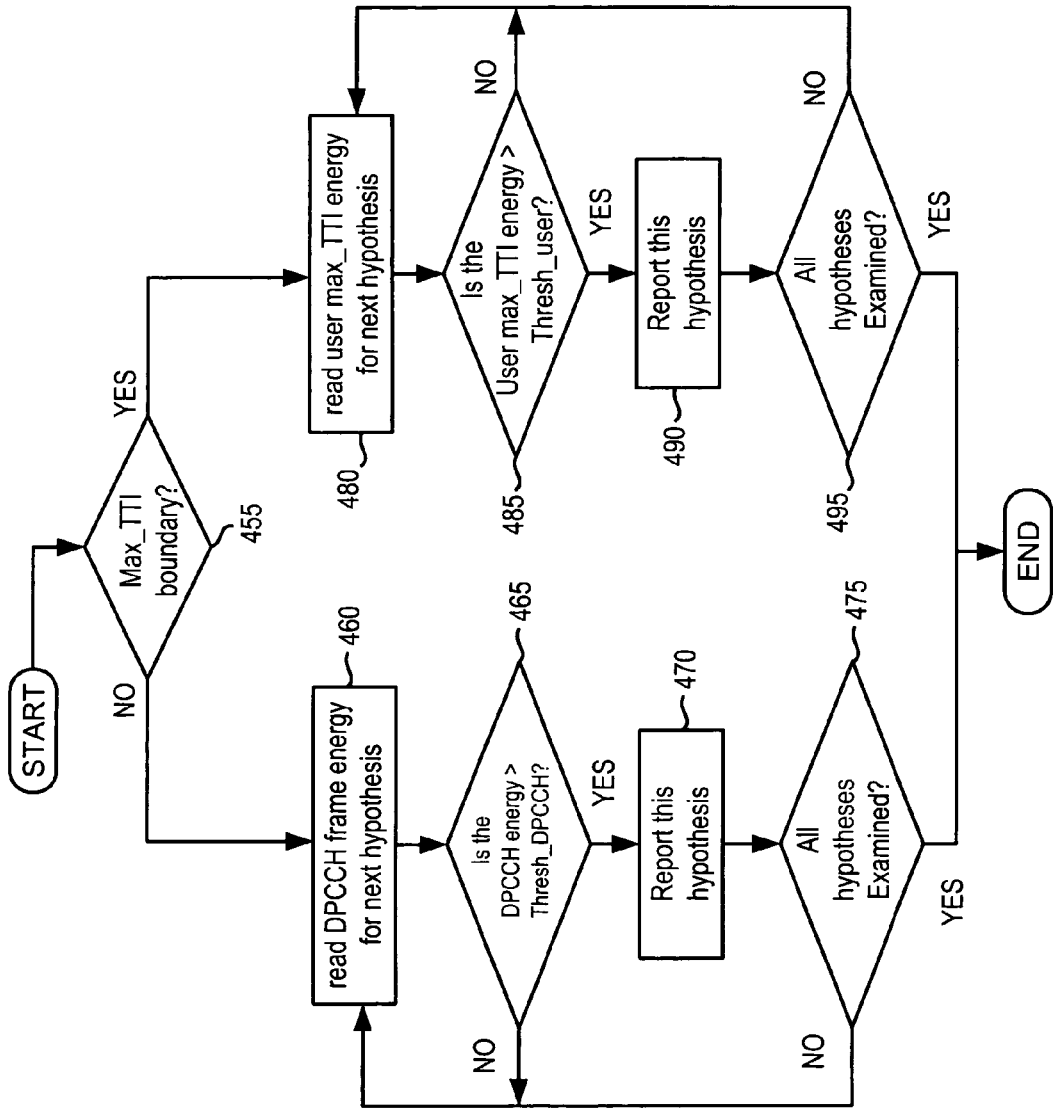

FIGS. 4A-4C illustrate process flows for multipath acquisition of a dedicated traffic channel in accordance with an example embodiment of the present invention. FIG. 4A illustrates a modification of the multipath acquisition processing flowchart illustrated in FIG. 3A. FIG. 4B is a user energy calculation performed for each hypothesis over the given duration. The hypotheses reporting flowchart in FIG. 4C is a modification from that shown in FIG. 3B.

FIG. 4A illustrates a method of multipath acquisition using the DPDCH information. The DPDCH is used every maximum TTI. The maximum TTI may be understood as the maximum of the Transmission Time Intervals (TTIs) of all transport channels contained in the DPDCH. In UMTS, each transport channel contained in the DPDCH may have a different TTI as compared to other transport channels contained within the same DPDCH. The TTI may have a duration selected from 10 ms, 20 ms, 40 ms and 80 ms, for example. The maximum TTI is used because all data blocks from all transport channels in the TTI are decoded at the end of each maximum TTI, but not prior to the end of the TTI.

As shown in FIG. 4A, the decoded DPDCH bits are recoded (at 405) and used to remove the data-dependency in the DPDCH channel. This is shown in the 'descrambling and despreading with DPDCH orthogonal code block 410. The matched filter output from matched filter 255 corresponding to this hypothesis (e.g., complex signal) is input to buffer at 415. The buffer 415 may be exemplified as a first-in-first-out (FIFO) memory that acts as a delay line to compensate the processing time required to generate the re-encoded DPDCH symbol.

In general, DPDCH data in that maximum TTI should be used where the CRC checks yield 'pass' for each and every transport block in that TTI. The 'Binary mobility indicator' (from 264) is used to equally bisect the time slot for the DPDCH signal if the mobility is high. Otherwise there will be no bisecting segmentation (first segment has the full slot length and second segment has zero length). Function 420*a/b* and 430*a/b* are as described with respect to FIG. 3A, thus a detailed explanation is omitted for brevity. The inputs are accumulated (440) over a given duration, which in an example represents the maximum TTI (in milliseconds) or maximum TTI/10 (max_TTI/10) frames (as 1 frame=10 ms). The resultant output is a DPDCH frame energy metric, shown at 450 as a DPDCH max_TTI frame energy output metric or value.

FIG. 4B is a user energy (total of DPCCH and DPDCH frame energy) calculation performed for each hypothesis over the given duration. The DPCCH frame energy may metric be accumulated over the maximum TTI interval, as shown at 452. The DPCCH frame energy metric (value) may be calculated as previously described with respect to FIG. 3A, thus a detailed explanation thereof is omitted here for purposes of brevity. This energy metric is then combined at 453 with the most recently calculated DPCCH frame energy over maximum TTI interval (451) to generate the user energy over maximum TTI at 454, shown as a user max_TTI energy metric (value) in FIG. 4B.

FIG. 4C illustrates a hypotheses reporting flow process which executed each 10 ms radio frame. As shown in FIG. 4C, and to preserve the hypothesis reporting frequency, e.g., every 10 ms, the hypotheses reporting block 470 uses the metric of DPCCH signal energy (460, 465) when the user max_TTI energy (includes both DPCCH and DPDCH frame energy values) is not available (output of 455 is 'NO'). Similar to FIG. 3B, the comparison of each frame energy metric against the threshold and reporting of those path positions with a frame energy metric exceeding the threshold to processing circuitry within the base station receiver is performed until all hypotheses have been examined.

The reporting frequency of every 10 ms is substantially relevant and/or desirable for propagation channels such as the birth-death channel defined in 3GPP conformance tests. When user max_TTI energy is available (every maximum TTI, which is a multiple of 10 ms, in steps of 1, 2, 4 and 8), the hypotheses reporting block (here shown at 490) uses the user max_TTI energy metric (at 480, 485) to detect and report valid path positions. Where the user max_TTI energy metric or value is not available (as max_TTI may be larger than 10 ms), the DPCCH frame energy metric as calculated from FIG. 3A may be used to determine valid path positions, so that the path position update frequency of 10 ms may be maintained.

The example methodology described above may be employed for any network based on one or more of UMTS (release 99, R4, R5, R6 and above), and may be adaptable for CDMA (IS95, cdma2000 and various technology variations), GSM, 802.11 and/or related technologies (such as 802.15 and 802.16), including communication systems or networks based on technologies other than the above (such as cdma2000 1×EVDO Rev B and UMTS Release 7), which may be in various stages of development and intended for future replacement of, or use with, the above networks or systems.

In the example method, the data part has been described as a DPDCH and the control part as a DPCCH, the convention known and used in UMTS. However, in cdma2000 systems, to which the example method id also applicable, the analogous data channel is the FCH/SCH and the analogous control channel is the pilot/power control sub-channel.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed:

1. A method of multipath acquisition for a dedicated uplink traffic channel, comprising:
    determining path positions of the traffic channel having desired signal energy for processing in a base station receiver as a function of at least information contained in a data part of the traffic channel, the traffic channel including both the data part and a control part, the control part including control information associated with the data part; wherein
        the desired signal energy for a given path position is one of a control channel frame energy value determined from the control part, and a user energy value determined by combining a data channel energy value calculated from the data part and the control channel frame energy, and
        the data channel energy value is based on L2-Norms and re-encoded data part symbols.

2. The method of claim 1, wherein the information contained in the data part is a Dedicated Physical Data CHannel (DPDCH) signal and decoded bits in the DPDCH are recoded as symbols for removing the data-dependency of the DPDCH signal.

3. The method of claim 2, wherein the DPDCH is configured to be segmented based on user mobility.

4. The method of claim 1, wherein the traffic channel includes pilot signal information in the control part.

5. The method of claim 4, wherein the data part is a DPDCH or a Fundamental CHannel/Supplemental CHannel (FCH/SCH) and the control part is a Dedicated Physical Control CHannel (DPCCH) or a pilot/power control sub-channel.

6. The method of claim 4, wherein the control channel frame energy is a DPCCH frame energy value determined from the control part, and the data channel energy value is a DPDCH energy value.

7. The method of claim 6, wherein determining includes:
    comparing one of the DPCCH frame energy and the user energy values for each path position to a given threshold, and
    reporting path positions having one of the DPCCH frame energy or user energy values exceeding the threshold to processing circuitry within the base station receiver.

8. The method of claim 1, wherein determining path positions of the traffic channel having desired signal energy includes calculating a DPDCH frame energy value for each given path position.

9. The method of claim 8, wherein calculating includes:
    descrambling and despreading a filtered DPDCH signal output of the traffic channel frame that is received by the receiver and which corresponds to a given path position, and removing the data-dependency of the DPDCH using re-encoded DPDCH symbols of the frame so as to output first and second output symbols corresponding to the DPDCH signal;
    accumulating the first output symbols in a first given segment of a slot of the frame to output a first accumulated data signal and the second output signals in a second given segment of the frame to output a second accumulated data signal
    calculating L2 norms for the first and second accumulated data signals to generate a plurality of input signals, and
    accumulating the input signals over a given duration to generate a desired DPDCH frame energy value for the given path position.

10. The method of claim 1, wherein the determining step further comprises:
    calculating a signal energy for candidate path positions of a traffic channel as a function of at least the information contained in the control part of the traffic channel;
    comparing the signal energy for each candidate path position to a given threshold; and
    identifying candidate path positions having a signal energy exceeding the given threshold as the path positions of the traffic channel having desired signal energy for processing in the base station receiver.

11. A method of multipath acquisition for a dedicated uplink traffic channel, comprising:
    determining path positions of the traffic channel that have desired signal energy for processing in a base station receiver based on a DPDCH signal contained in the traffic channel and on information contained in a control part of the traffic channel; wherein the desired signal energy for a given path position is one of a control channel frame energy value determined from the control part, and a user energy value determined by combining a data channel energy value calculated from the DPDCH signal and the control channel frame energy, and the data channel energy value is based on L2-Norms and re-encoded data part symbols.

12. A method of calculating frame energy of a dedicated uplink traffic channel frame for multipath acquisition of one or more path positions of the frame that are received by a base station receiver, comprising:

descrambling and despreading a filtered DPDCH signal output of the traffic channel frame that is received by the receiver and which corresponds to a given path position, and removing the data-dependency of the DPDCH using re-encoded DPDCH symbols of the frame so as to output first and second output symbols corresponding to the DPDCH signal, accumulating the first output symbols in a first given segment of a slot of the frame to output a first accumulated data signal and the second output signals in a second given segment of the frame to output a second accumulated data signal, calculating L2 norms for the first and second accumulated data signals to generate a plurality of input signals, and accumulating the input signals over a given duration to generate a desired DPDCH frame energy value for the given path position.

13. A method of determining valid paths for a dedicated uplink traffic channel received at a base station receiver, comprising, for each given path position:

determining a DPCCH frame energy value based on information contained in a control part of a frame of the traffic channel, determining a DPDCH frame energy value over a given duration based on information contained in a data part of the frame, combining the DPCCH and DPDCH frame energy values to generate a user energy value over the given duration, comparing one of the DPCCH frame energy and the user energy values for each given path position to a given threshold, and reporting path positions having one of the DPCCH frame energy or user energy values exceeding the threshold to processing circuitry within the base station receiver; wherein the DPDCH frame energy value is based on L2-Norms and re-encoded DPDCH symbols.

14. The method of claim 13, wherein the user energy value is compared to the given threshold, else the DPCCH frame energy value is compared to the threshold for a given path position where the user energy value is not available so as to maintain a given update frequency for the path positions.

15. A method of determining valid paths for a dedicated uplink traffic channel received at a base station receiver, comprising, for each given path position:

determining a DPCCH frame energy value based on information contained in a control part of a frame of the traffic channel, determining a DPDCH frame energy value over a given duration based on information contained in a data part of the frame, combining the DPCCH and DPDCH frame energy values to generate a user energy value over the given duration, comparing one of the DPCCH frame energy and the user energy values for each given path position to a given threshold, and reporting path positions having one of the DPCCH frame energy or user energy values exceeding the threshold to processing circuitry within the base station receiver; wherein the DPDCH frame energy value is based on re-encoded DPDCH symbols, and the given duration is a maximum transmission time interval (TTI) of all transport channels contained in the DPDCH.

* * * * *